(12) United States Patent
Brinkhus

(10) Patent No.: US 6,516,377 B1
(45) Date of Patent: Feb. 4, 2003

(54) SELF-CONFIGURING MODULAR ELECTRONIC SYSTEM

(76) Inventor: Hartmut B. Brinkhus, Berghalde 54 D-69126, Heidelberg (DE)

( * ) Notice: Subject to any disclaimer, the term of this patent is extended or adjusted under 35 U.S.C. 154(b) by 0 days.

(21) Appl. No.: 09/458,786

(22) Filed: Dec. 10, 1999

(30) Foreign Application Priority Data

Dec. 11, 1998 (DE) .......................................... 198 57 255

(51) Int. Cl.⁷ .............................................. G06F 13/38
(52) U.S. Cl. ........................... 710/305; 710/3; 710/104; 713/1
(58) Field of Search ................................ 710/104, 305, 710/3, 26; 439/83; 711/115; 361/748, 760, 730, 689; 326/62, 82; 708/711

(56) References Cited

U.S. PATENT DOCUMENTS

| | | | | |
|---|---|---|---|---|
| 3,987,291 A | * | 10/1976 | Gooding et al. | 708/711 |
| 4,501,460 A | * | 2/1985 | Sisler | 361/730 |
| 4,717,217 A | * | 1/1988 | Bogese, II | 439/83 |
| 4,727,475 A | * | 2/1988 | Kiremidjian | 710/104 |
| 4,740,916 A | * | 4/1988 | Martin | 711/115 |
| 4,849,752 A | | 7/1989 | Bryant | |
| 5,065,277 A | * | 11/1991 | Davidson | 361/689 |
| 5,590,372 A | * | 12/1996 | Dieffenderfer et al. | 710/3 |
| 5,612,634 A | * | 3/1997 | MacKenna | 326/62 |
| 5,644,732 A | * | 7/1997 | Davidson | 710/104 |
| 5,793,998 A | * | 8/1998 | Copeland et al. | 710/305 |

FOREIGN PATENT DOCUMENTS

| | | |
|---|---|---|
| DE | 2932868 A1 | 3/1980 |
| DE | 3347357 A1 | 7/1985 |
| DE | 3640670 A1 | 6/1988 |
| DE | 3938018 C2 | 5/1993 |
| DE | 4119584 C3 | 8/1995 |
| DE | 4421344 A1 | 12/1995 |
| DE | 19701508 A1 | 7/1998 |
| DE | 29708461 U1 | 7/1998 |
| EP | 0166220 A2 | 1/1986 |
| EP | 0336708 A3 | 10/1989 |
| EP | 0491480 A2 | 6/1992 |
| WO | WO92/04675 | 3/1992 |
| WO | WO97/22935 | 6/1997 |

* cited by examiner

*Primary Examiner*—Peter Wong
*Assistant Examiner*—Benjamin Ortiz, Jr.
(74) *Attorney, Agent, or Firm*—Senniger, Powers, Leavitt & Roedel

(57) ABSTRACT

In an electronic system, an arithmetic device is provided between successive bus terminals or between successive modules, respectively, with an identification signal applied to a bus input that is routed from one bus terminal to the next bus terminal until the identification signal has passed through all bus terminals in order to identify the modules. The identification signal is subjected to an arithmetic operation and consequently changed in each arithmetic device before it is forwarded to the next bus terminal, wherein the "results of the operations" are used for identifying the individual bus terminals and the individual modules, respectively.

15 Claims, 9 Drawing Sheets

SELF-CONFIGURING MODULAR ELECTRONIC SYSTEM

BACKGROUND OF THE INVENTION

The invention relates generally to self-configuring modular electronic systems and, particularly, to a computer system having a data and address bus with multiple lines and having several addressable modules electrically connected to the bus via respective module lines.

An electronic system of this type is known from EP 0 491 480 A2. In order to address electronic modules in computers, a series of bus line pairs between successive slots are interchanged in accordance with a binary pattern such that each slot has an unmistakable coding. During an initialization phase of the computer, a bit pattern of predetermined signals is applied to the bus line pairs. Due to the reversal of the bus line pairs, each slot then receives a different bit pattern such that each station is able to identify its assigned slot and thus receives an unmistakable address.

U.S. Pat. No. 4,727,475 describes a self-configuring modular computer system with a central processing unit and several modules that are connected to a bus. A call signal generated by the central processing unit is received by the module located closest to the central processing unit. This module applies an identification signal to the bus, with the central processing unit generating a base address for the module. This process is repeated until all modules have been assigned a bus base address. This system requires that each module have an individual identifier at the beginning of the address assignment process such that all modules can be individually addressed sequentially.

DE 33 47 357 A1 describes a similar device for assigning addresses to plug-in modules. In this case, a characterizing module identifier is applied to each module. In addition, each module is given a slot identifier. During initialization, all modules are called by means of the slot identifier and give the control unit their respective module identifiers. The control unit then assigns the modules their relevant address by addressing the slot identifier with the relevant address being used for the additional exchange of data.

DE 29 32 868 A1 describes a data processing circuit arrangement with a central processing unit to which several peripheral devices are connected. Each peripheral unit has an electronically programmable address memory, with each address memory being connected to a central processing unit via a separate enabling line that is only assigned to the respective address memory. Each individual peripheral unit can be addressed and assigned an address by the central processing unit via this enabling line.

DE 39 38 018 C2 describes an information processing system and a method for determining its configuration. Each slot for modules has separate connections, the potential levels of which process a "slot-ID-signal" in order to allow the individual addressing of the respective slot. A certain address can then be assigned to each module at the corresponding slot by a central processing unit.

DE 44 21 344 A1 describes a supplementary card for a computer which has a predetermined digital hardware identification. This identification makes it possible to address each individual supplementary card and assign an address for a bus system to each card by a central processing unit.

The entire disclosures of the aforementioned references are incorporated herein by reference.

In known systems, the configuration and the identification of the connected modules is realized by means of reversed bus lines, by assigning different initialization addresses to the individual modules, or by providing additional lines that are assigned to the respective modules. For this reason, a self-configuring modular electronic system that has a simple design and that makes it possible to connect a series of addressable modules to a common bus, where all modules may also be absolutely identical, is desired.

SUMMARY OF THE INVENTION

The present invention meets the above needs and overcomes the deficiencies of the prior art by providing a self-configuring modular electronic system that has a simple design and that makes it possible to connect a series of addressable modules to a common bus, where all modules may also be absolutely identical.

The invention is based on the idea of routing an identification signal from module to module, and to change this identification signal in defined fashion during the routing. So that, each module receives a different identification signal that unmistakably differentiates it from the remaining modules and, for example, may be used for addressing purposes.

The identification signal is changed with the aid of arithmetic devices that, for example, may consist of full adders and respectively add a signal that corresponds to a number (e.g., a "1") to the identification signal. The result of the addition is routed to the next bus terminal or the next module such that a separate address, e.g., an address that is incremental by "1" (address number), can be assigned to each module.

In this case, the arithmetic devices may be directly arranged on the bus between respectively adjacent slots and/or integrated into the individual modules.

The invention can be used for configuring or addressing individual components of a computer system, e.g., individual microprocessors, network cards, memory cards, etc., which are connected to the corresponding bus terminals. However, it is explicitly noted that the invention may also be used in any given electronic system in which several modules to be identified are connected to one another via a line system.

Devices for electrically connecting the modules to the data and address bus, e.g., sockets or terminal strips, are preferably provided on the individual bus terminals.

The spatial arrangement of the individual modules may be selected differently. According to one variant, the modules are arranged adjacent to one another in a single plane on a printed-circuit board. Alternatively, it is also possible to "stack several modules one atop the other," with the individual modules being interconnected and to the bus via electronic connecting means, e.g., sockets. Such a "three-dimensional" arrangement of the individual modules makes it possible to achieve a high component density and thus contributes to the additional miniaturization of the system. In addition, it is possible to arrange several such stacks consisting of individual modules adjacent to one another.

The individual modules may consist of independent central processing units, independent computers, peripheral devices, memory modules or the like, all of which communicate with one another via a common system. The individual modules may also have their own "intelligence." However, this is not absolutely imperative. In particular, it is possible to use several absolutely identical modules.

Alternatively, the invention may comprise various other methods and systems.

Other objects and features will be in part apparent and in part pointed out hereinafter.

BRIEF DESCRIPTION OF THE DRAWINGS

The invention is described in greater detail below with reference to embodiments that are illustrated in the figures. The figures show.

Corresponding reference characters indicate corresponding parts throughout the drawings.

DETAILED DESCRIPTION OF PREFERRED EMBODIMENTS

Figure 1:
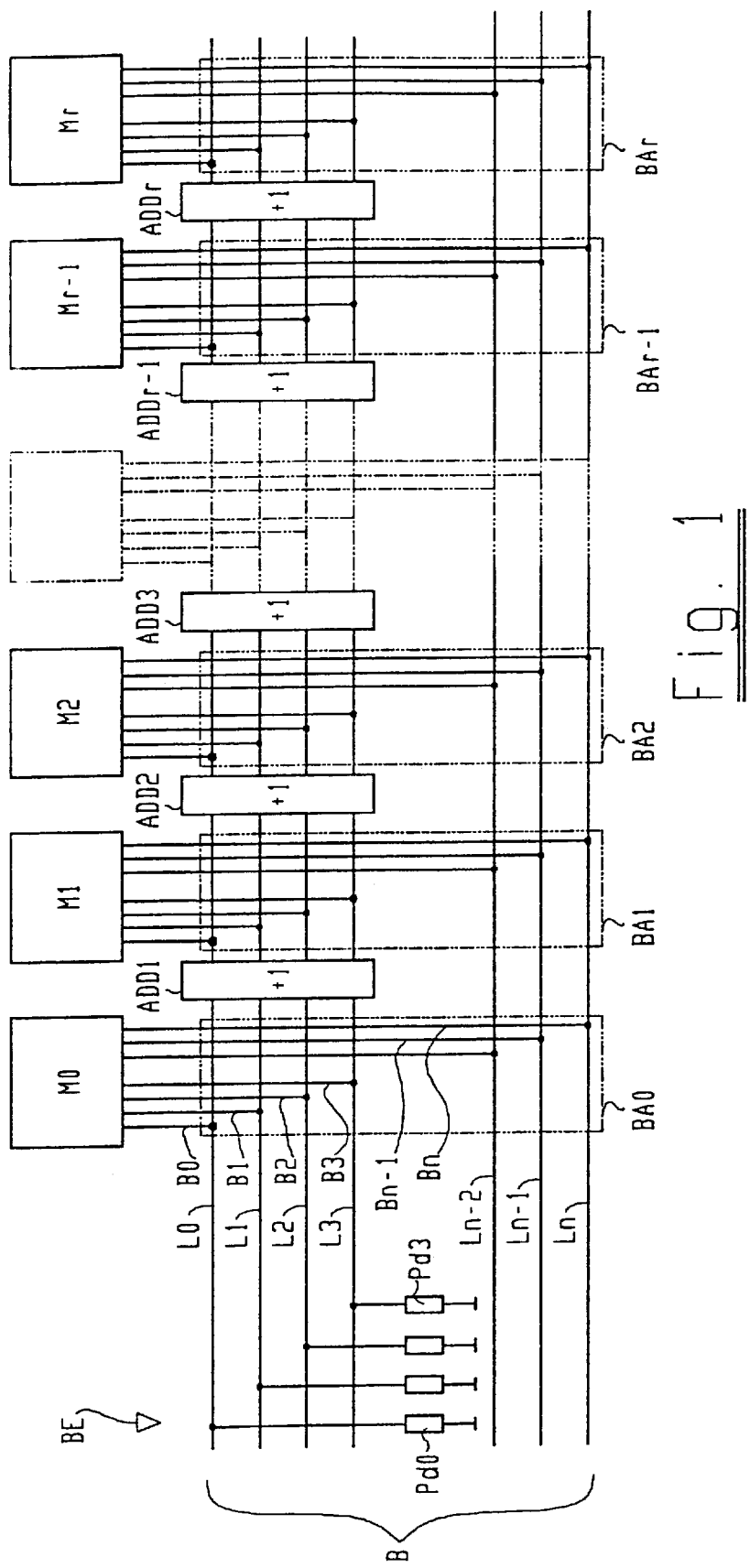
FIG. 1, a basic circuit diagram of a self-configuring modular computer system according to the invention, in which the arithmetic devices are arranged directly on the bus system.

The computer system according to FIG. 1 contains a bus system with n+1 bus lines L0–Ln that represent the conventional address and data lines of a bus B. Bus terminals BA0–BAr that, for example, are formed by slots or solder contacts are provided on the bus B. The modules M0–Mr are connected to these bus terminals, with each module M0–Mr containing module lines B0–Bn that are respectively connected to an assigned bus line L0–Ln. In addition, each adder ADD1–ADDr is respectively provided between each bus terminal BA0–BAr and between each module M0–Mr, with said adders being electrically connected to the bus lines L0–L3.

Pull-down resistors Pa0–Pd3 that are connected between ground and an assigned bus line L0, L1, L2 and L3, respectively, are provided at a bus input BE in.

In order to identify the bus terminals of the individual modules M0–Mr—which, for example, takes place when switching on the electronic system—the bus lines L0–L3 are connected to ground potential, which corresponds to a signal with the value "0" via the pull-down resistors Pd0–Pd3. This signal with the value "0" is fed to the module M0 via the module lines B0–B3 that are connected to the bus lines L0–L3, with this module determining from this signal that it is connected to the bus B at the bus terminal BA0.

The signal with the value "0" is simultaneously fed to the adder ADD1 that adds the value "1" to the signal. The resulting signal with the value "1" is fed to the next module M1 and the adder ADD2 via the module lines B0–B3. Similarly to the module M0, the module M1 determines from this signal that it is connected to the bus terminal BA1.

The adder ADD2 also adds the value "1" to the signal with the value "1" it receives, with said adder routing the resulting signal with the value "2" to the adder ADD3 and the module M2 that identifies its assigned bus terminal BA2. The identification of the bus terminals of the remaining modules takes place similarly.

After the identification of the bus terminals of the individual modules M0–Mr has taken place, the bus lines L0–L3 can be used as "normal" lines.

Alternatively, the respective bus terminal number can also be assigned to the modules by a "subsequent" adder, i.e., the number "1" is assigned to the first module by the adder ADD1, the number "2" is assigned to the second module by the adder ADD2, etc.

Arithmetic devices other than the adders ADD1–ADDr shown, e.g., multipliers, may be alternatively provided. However, it must be ensured that the "resulting signals" obtained by the respective operation can be clearly differentiated such that the bus terminals can be identified.

Figure 2:
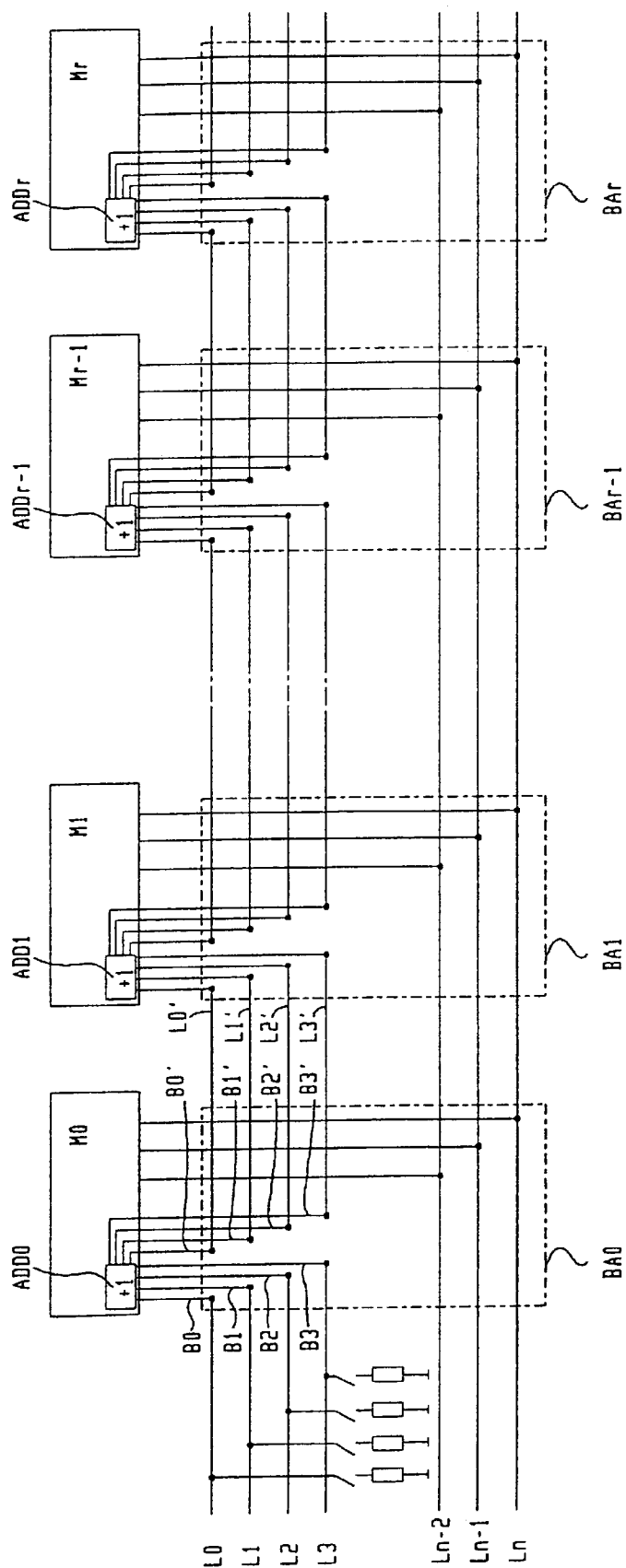
FIG. 2, a basic circuit diagram of a self-configuring modular computer system, in which the arithmetic devices are integrated into the modules.

FIG. 2 shows an embodiment in which the adders ADD1–ADDr are integrated into the modulesh M0–Mr. In order to identify the bus terminals BA0–BAr, a signal with the value "0" is fed to the adder ADD1 of the module M0 via the module lines B0–B3. The adder ADD1 adds a value "1" to this signal and routes the resulting signal to the adder ADD1 of the next module M1 via the module lines B0'–B3' and the bus lines L0'–L3' connected to these module lines, respectively. The signal is processed similarly by the next adder. The modules M0–Mr then determine their respective bus terminal BA0–BAr either from the signals fed to the modules via the module lines B0–B3 or from the signals obtained from the additions which are routed to the next module via the module lines B0'–B3'.

If one of the bus terminals is unoccupied, i.e., if, for example, no module is connected to the bus terminal BA2, it must be ensured with corresponding devices that the bus lines L0'–L3' are electrically connected to assigned bus lines L0"–L3" such that the modules Mr-1 and Mr are able to determine their bus terminal. This may, for example, be achieved with resistors R0–R3 as described below with reference to FIG. 3.

Figure 3:
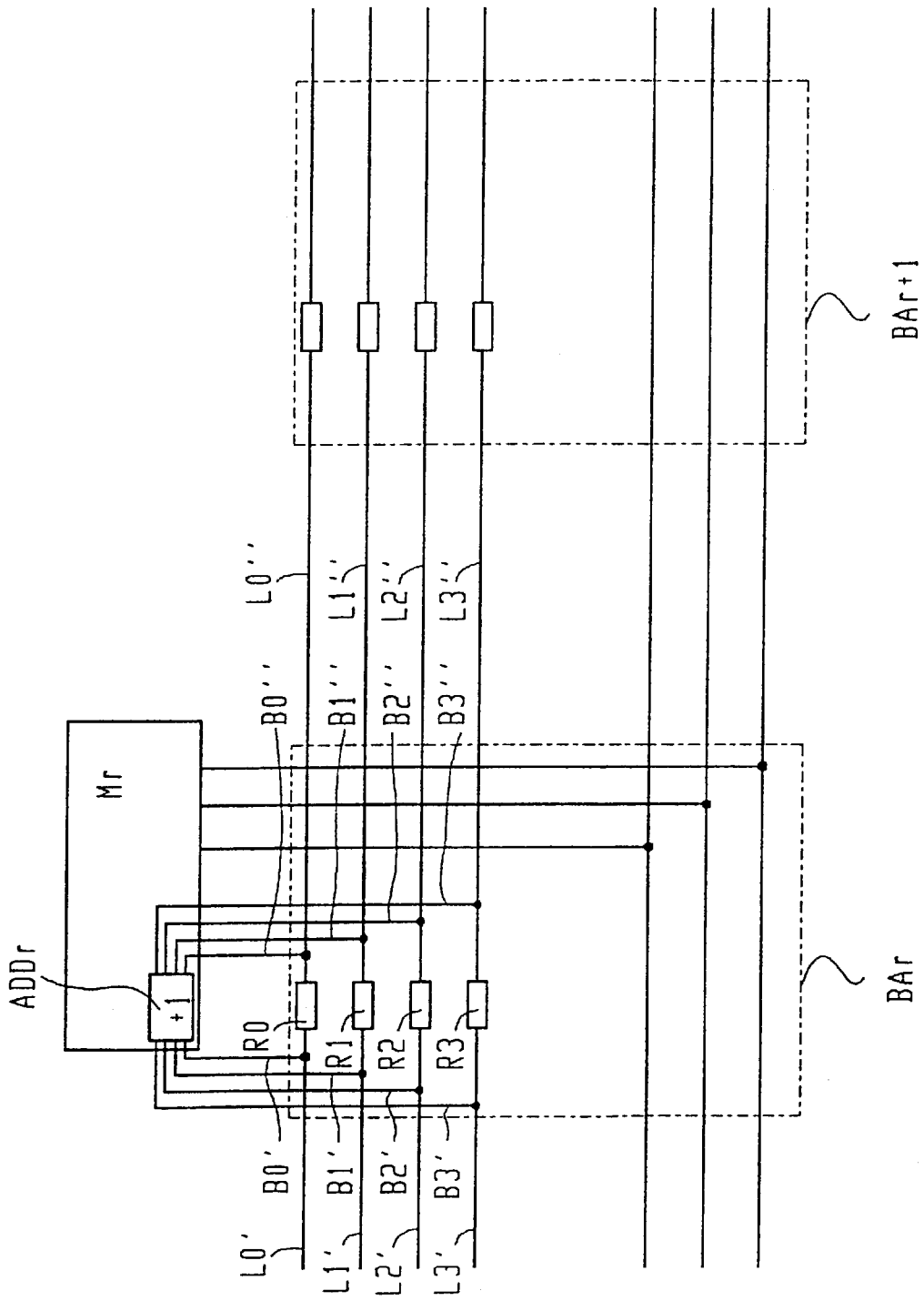
FIG. 3, bus terminals with resistors for the transmission of signals if a bus terminal is unoccupied.

In FIG. 3, the module Mr is connected to the bus terminal BAr, and the bus terminal BAr+1 is unoccupied. In contrast to the embodiment shown in FIG. 2, the bus lines L0'–L3' are respectively connected to the assigned bus lines L0"–L3" via a resistor R0–R3 in FIG. 3. The resistors R0–R3 may be 1Ω resistors for example. If a module is not connected to a bus terminal, the resistors R0–R3 route the output signals of the previous bus terminal that are applied to the bus lines L0'–L3' or the output signals of the previous module to the bus lines L0"–L3" and thus to the next bus terminal or the next module, respectively. If a module Mr is connected as is the case with the bus terminal BAr, the signals routed via the resistors R0–R3 are overwritten by the signals conveyed via the module lines B0'–B3' or B0"–B3" since the signals routed via the module Mr have a lower resistance than the signals conveyed via the resistors R0–R3.

It is also possible to use bus terminals instead of the resistors R0–R3 as described below with reference to FIGS. 4a and 4b.

Figure 4B:
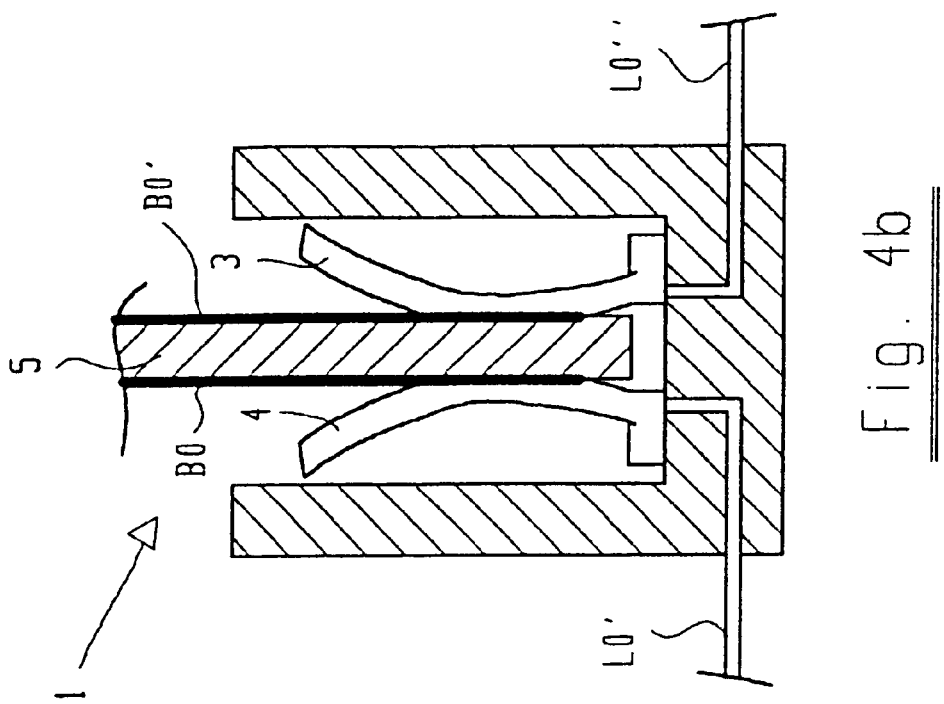
FIGS. 4a and 4b, a bus terminal.
Figure 4A:
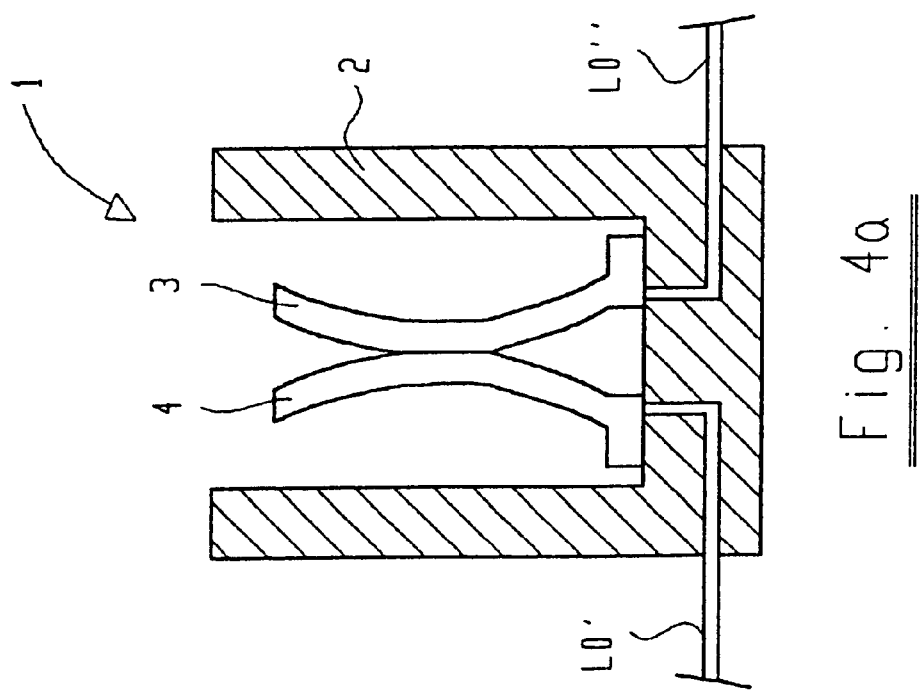

FIG. 4a shows a bus terminal 1 with a housing 2 and two elastic, electrically conductive clamping springs 3 and 4 that contact one another and that are connected to bus line L0' and L0" respectively. This means that the clamping springs bypass the bus terminal if it is unoccupied.

FIG. 4b shows the bus terminal 1 of an "occupied" bus terminal, with a connector 5 of the module M1 (FIG. 2) being plugged into this terminal. The connector 5 contains the module lines B0 and B0' that are connected to the adder ADD1 and that are respectively electrically connected to the bus lines L0' and L0" via the clamping springs 3 and 4.

There exist several options for the spatial arrangement of the individual modules M0–Mr. For example, the modules may be arranged adjacent to one another in a single plane as indicated in FIGS. 1 and 2. Alternatively, it is also possible to realize a three-dimensional arrangement of the individual modules.

Figure 5:
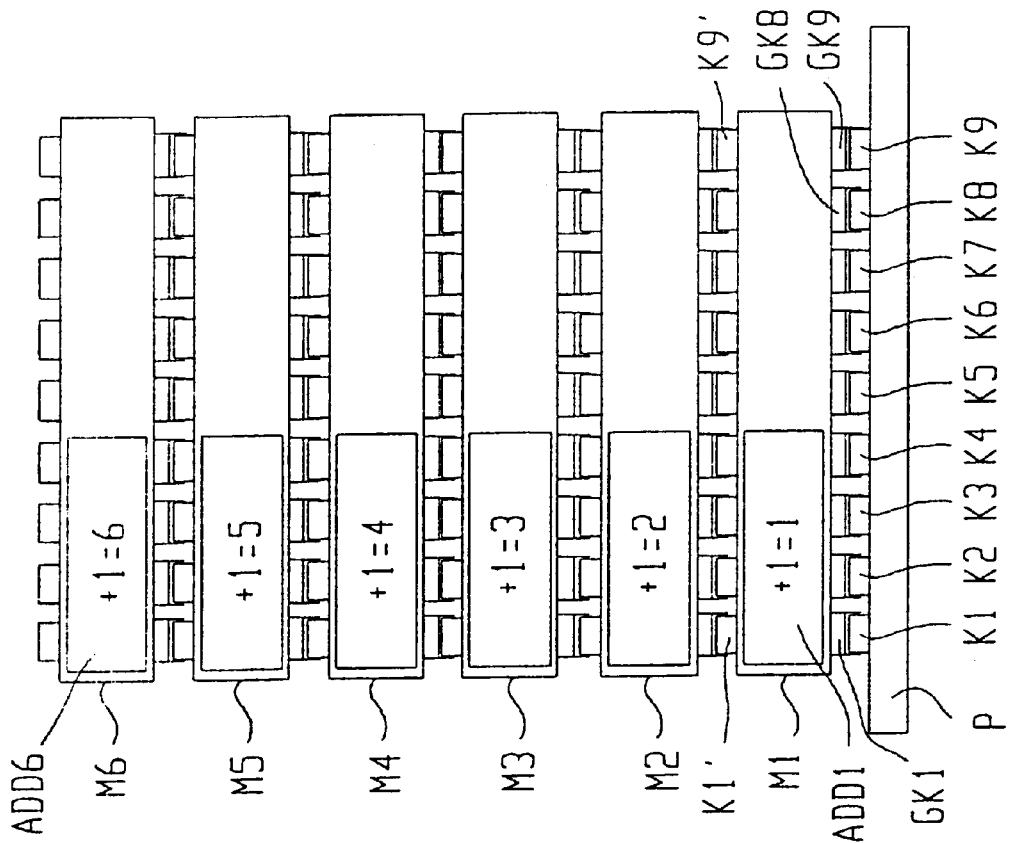
FIG. 5, an embodiment in which several modules are stacked on top of one another.

FIG. 5 shows an embodiment in which several modules M1–M6 are stacked one atop the other. Electric contacts K1–K9 that are connected to the individual bus lines (not shown) are provided on a base printed-circuit board P. The contacts K1–K9 may, for example, be formed by a terminal strip (or by a socket according to DE 297 08 461 U1, the entire disclosure of which is incorporated herein by reference) that is arranged on a main printed-circuit board of the computer. The module M1 contains corresponding opposing contacts GK1–GK9 that are electrically connected to the contacts K1–K9 of the printed-circuit board. Contacts K1'–K9' are provided on the side of the module M1 which is located opposite to the counter contacts GK1–GK9, with said contacts being designed in accordance with the contacts K1–K9 of the base printed-circuit board P. This allows the stacked arrangement of the individual modules shown.

Similar to the embodiment shown in FIG. 2, adders ADD1–ADD6 are integrated into the individual modules M1–M6, with each adder also adding a "1" as indicated by the addition terms "+1=2,""+1=3," etc. The wiring of the modules M1–M6 and the adders ADD1–ADD6 may be realized similarly to FIG. 2.

The three-dimensional arrangement of the modules M1–M6 shown in FIG. 5 saves much space, so that an additional miniaturization of electronic systems is possible. Naturally, it is also possible to arrange several "stacks" on a base printed-circuit board as shown in the basic circuit diagram according to FIG. 6.

Figure 6:
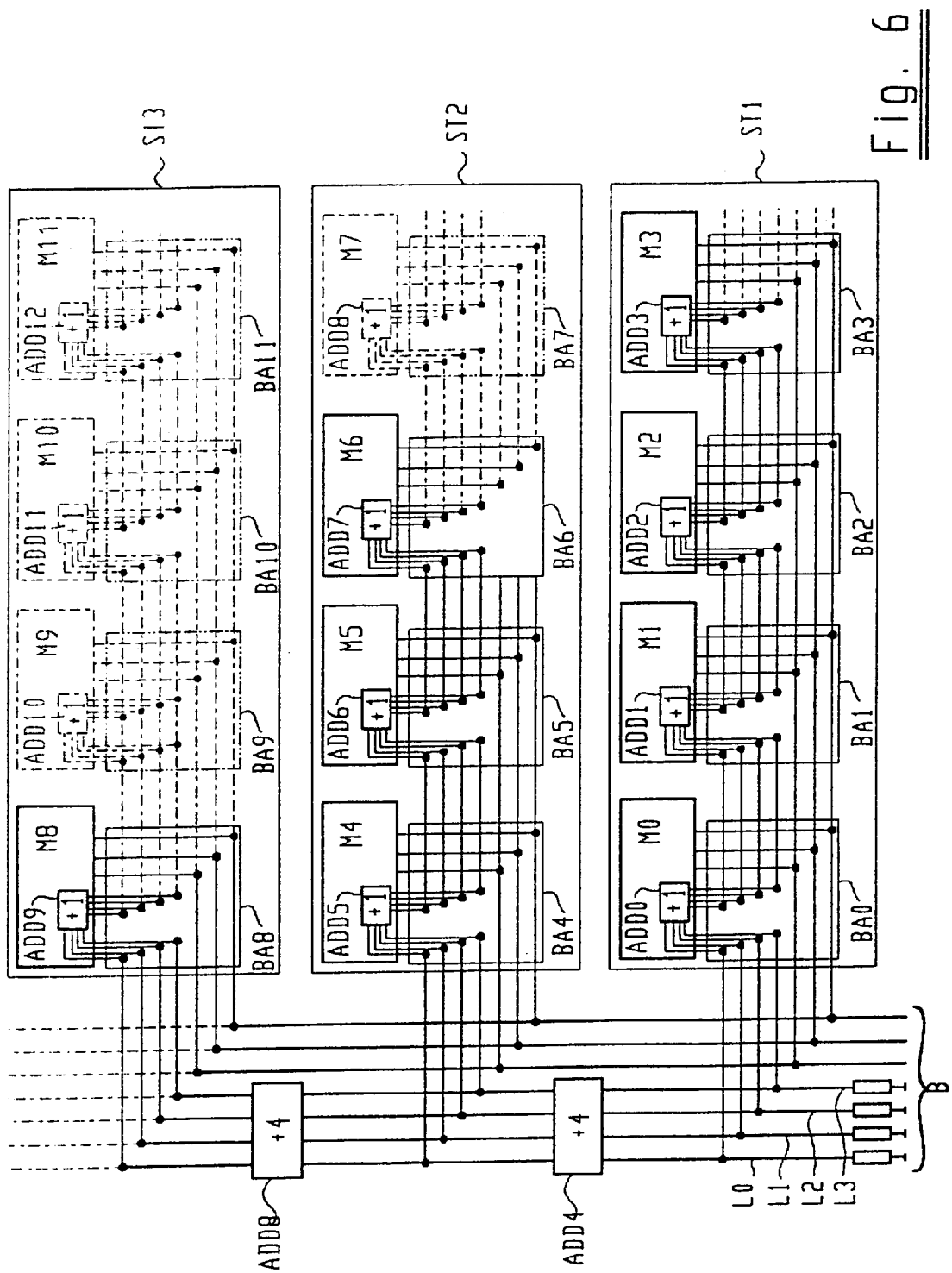
FIG. 6, a basic circuit diagram of a self-configuring modular computer system, in which several groups of stacked modules are shown.

FIG. 6 shows a basic circuit diagram for the stacking of modules, with this figure containing the schematic "stacks" ST1, ST2 and ST3 that respectively consist of no more than n modules (in this case, n=4). The stack ST1 is fully "occupied" and thus contains four modules M0–M3, the stack ST2 consist of the modules M4–M6, and the "stack" ST3 consists of only one module M8. However, the stacks ST2 and ST3 may also contain a total of four models as the case with the stack ST1. This is indicated by the modules M7, M9, M10 and M11 that are indicated by broken lines.

In order to identify the respective bus terminals of the individual modules, adders ADD0–ADD3, ADD5–ADD8 and ADD9–ADD12, respectively, are provided similarly to FIG. 2. These adders are integrated into the individual modules. During the identification of the bus terminals, a signal with the value "0" is applied to the bus lines L0–L3, with the modules M1–M4 of the stack 1 determining their respective bus terminals BA0–BA3 in accordance with the embodiment shown in FIG. 2.

The signal with the value "0" is simultaneously fed to an adder ADD4 that is arranged directly on the bus B between the two stacks ST1 and ST2 and adds a value n ("4") to this signal. The thus obtained signal with the value "4" is fed to the "first" module M4 of the stack ST2, with this module determining the assigned bus terminal BA4, and with the adder ADD5 adding a "1" and forwarding a signal with the value "5" to the module M5. In the same way, the modules M5 and M6 respectively determine their assigned bus terminals BA5 and BA6, respectively.

The signal with the value n ("4") generated by the adder ADD4 is also fed to an adder ADD8. This adder also adds a value n ("4") and feeds the resulting signal with the value 2n ("8") to the module M8 of the stack ST3, with this module determining its bus terminal BA8 from this signal.

The number added to a signal value by the adders ADD4 or ADD8 corresponds to the maximum number of modules in a stack, i.e., the number n ("4") in this case. If it is desired to use stacks consisting of more than 4 modules, the adders ADD4 and ADD8 must to add correspondingly higher numbers. Thus, it is ensured that each module is able to determine its individual bus terminal such that it can be individually addressed if the stacks ST1–ST3 are "fully occupied."

Preferably, the bus B has exactly n select bus lines provided for identification purposes. If more than $2^n$ modules M0–M18 to be identified are connected to the bus B, the identification signal is successively fed to the first $2^n$ modules M0–M15 at a first reset signal level (Reset=1). In the embodiments shown in FIGS. 1–6, only four bus lines, the bus lines L0–L3, were used. This means that no more than $2^4$=16 modules can be identified.

If more than 16 modules are to be identified, additional bus lines can be provided or the identification can be performed in "two stages" as described below with reference to FIGS. 7a and 7b.

Figure 7A:
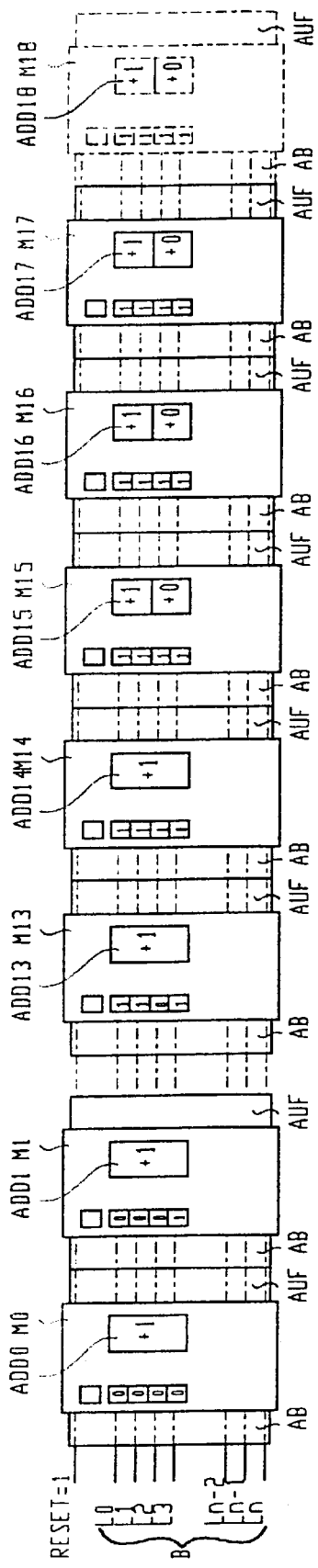
FIGS. 7a and 7b, an embodiment, in which the identification of the modules takes place in two identification phases, and FIGS. 8a and 8b, additional variants of the invention.
Figure 7B:
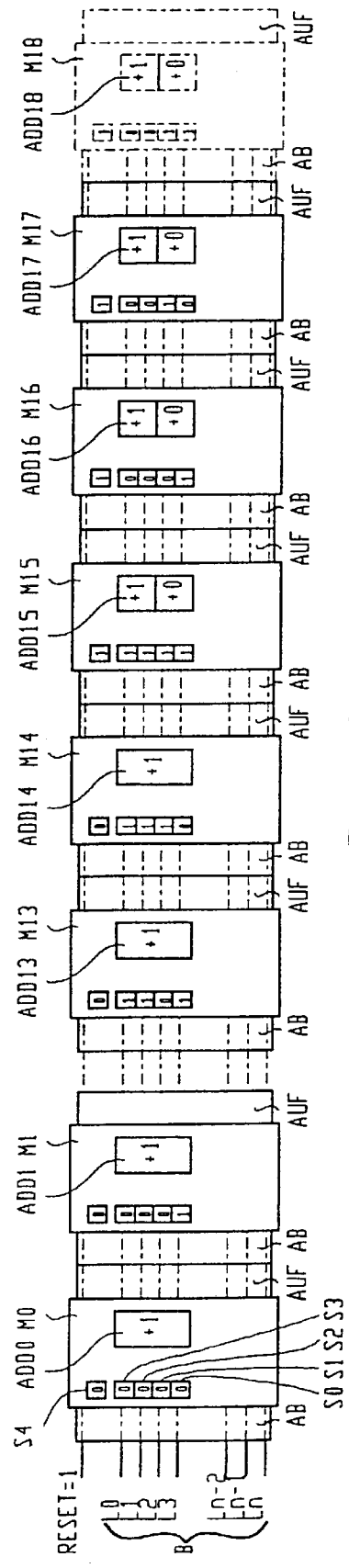

In the embodiment shown in FIGS. 7a and 7b, additional modules can be identified with the four bus lines L0–L3 and a reset line that is provided already in conventional computer systems, i.e., it is possible to "obtain" one additional bit without requiring an additional bus line.

Analogous to the previously described embodiment, an adder ADD0–ADD18 is assigned to each of the modules M0–M18 respectively. In this case, each adder is integrated into the corresponding module M0–M18. In addition, each module contains two plugs DOWN and UP, wherein an UP plug is connected to a corresponding DOWN plug of the subsequent module, and the DOWN plug of the module M0 is connected to the bus lines L0–Ln.

During a first identification phase, in which Reset=1 as shown in FIG. 7a, i.e., in which the reset line is active, the digital signal "0000" which corresponds to the decimal number "0" is fed to the module M0 via the lines L0–L3. Subsequently, the signal is forwarded to the next module, with the adders ADD0–ADD14 each adding a "1" such that, for example, the digital signal "1110" which corresponds to the number "14" is fed to the module M14 and the digital signal "1111" which corresponds to the number "15" is fed to the module M15.

The adders ADD16–ADD18 of the next modules M16–M18 either add a "1" or a "0" depending on the reset signal. In the first identification phase, in which Reset=1, the adders A16–A18 add a "0," i.e., the signal "1111" of the module M15 is initially forwarded to the next modules M16–M18 unchanged (FIG. 7a).

When the reset changes from "1" to "0," i.e., when the reset changes from active to inactive (FIG. 7b), the modules M0–M14 store their input digital values in four lower slot bits S0–S3, i.e., the module M0 stores "0000," M1 stores "0001," etc., and M14 stores "1110." In addition, the modules M0–M14 store a "0" in a fifth bit S4. The next modules M15–M18, in contrast, store a "1" in the fifth bit S4.

In a second identification phase, in which Reset=0, i.e., in which the reset is inactive, the modules M15–M18, which have stored a "1" in the fifth bit, are determined. Subsequently, the assigned adders ADD15–ADD18 also add a "1." Since only four lines L0–L3 used for identification are provided in this embodiment, an overflow that is not taken into account at first occurs at the adder ADD15. Consequently, the adder ADD15 delivers the signal "0000" to the module M16, whose adder ADD16 generates the signal "0001" and delivers this signal to M17, whose adder ADD17 generates the signal "0010," etc. Subsequently, the modules M15–M18, whose fifth slot bit is "1," also store the signals they receive via the bus lines L0–L3 in the lower bits "S0–S3."

This means that an unmistakable identification of all modules M0–M18 is possible despite the overflow occurring at the adder ADD15, due to the values "0" and "1" stored in the fifth slot bit S4 and the values stored in the lower four slot bits S0–S3.

In this embodiment, the bus lines L0–L3 cannot be used as "normal" data lines after the completion of the identification phase. However, their use as data lines possible if an additional bus line (not shown) is provided which, for example, indicates the end of the configuration.

If such an additional bus line is provided, each of the four lines L0–L3 can be separately configured as an input or output on the "DOWN and the UP side." In addition, a signal can be passed from one side to the other or vice versa. It is even possible for one of the modules M0–M18 to switch both sides (DOWN and UP) as outputs and deliver two signals or to switch both sides as inputs and receive two signals.

Figure 8A:
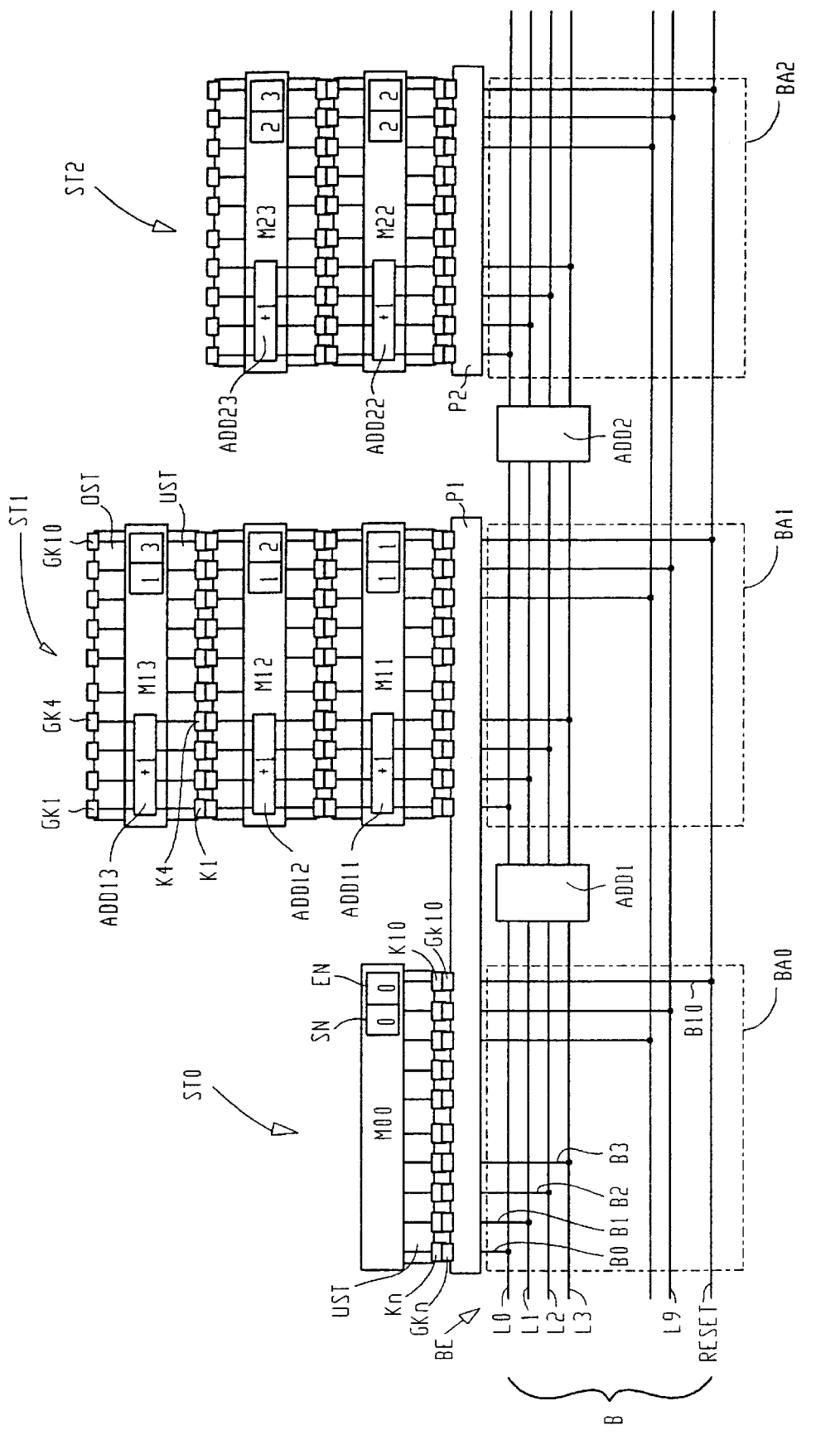

FIG. 8a shows a variation in which two base printed-circuit boards P1 and P2 are provided. Several modules are plugged onto these printed-circuit boards. This variation is referred to as the "base printed-circuit board variation" below. Two stacks ST0 and ST1 are plugged onto the base printed-circuit board P1, and one stack ST2 is plugged onto the base printed-circuit board P2. The stack ST0 consists of only one module M00, while the stacks ST1 and ST2, respectively, are formed by several modules M11, M12, and M13 and M22 and M23, respectively. These modules are stacked one on top of the other similar to a tower. Each of the modules shown in FIG. 8a contains a lower plug UST with contacts K1–K10 that are plugged onto complimentary counter contacts GK1–GK10 analogous to the embodiment according to FIG. 5. In this case, the modules M00 and M11 are plugged directly onto the counter contacts GK1–GK10 of the base printed-circuit board P1, and the module M22 is plugged directly onto the counter contacts GK1–GK10 of the printed-circuit board P2.

The modules of the stacks ST1 and ST2, respectively, contain an upper plug OST that is provided with counter contacts GK1–GK10 corresponding to the base printed-circuit boards P1 and P2 respectively.

In addition, each module contains a first storage unit SN and a second storage unit EN, where the value stored in the storage unit SN indicates the stack number of the respective module, and the value stored in the storage unit EN indicates the tier number. The stack number and the tier number together form the slot numbers of the modules. The module M00 belongs, for example, to the stack "0" and is arranged in its lowest tier, which is also numbered "0" in this case. This results in the slot number "00." However, the lowest tiers of the stacks ST1 and ST2 are numbered "1" and "2", respectively. This results in the respective slot numbers M11 and M22, respectively. This numbering is discussed in greater detail below.

The modules of the stacks ST1 and ST2, respectively, contain an adder analogous to FIG. 5. During an identification phase, these adders each add a "1" to a signal to be routed to the "next higher" module via the contacts K1–K4. The module M00 does not require an adder or an upper plug because here it forms the only module of the stack ST1.

Naturally, the upper plugs OST and the adders ADD13 and ADD23, respectively, may also be omitted from the "top" modules M13 and M23 of the stacks ST1 and ST2, respectively. All modules may also be absolutely identical to the modules of the stacks ST1 and ST2.

The modules M00, M11 and M22 are each connected to the bus lines L0–L9 and to a reset line of the bus B via the contacts K1–K10, the counter contacts GK1–GK10 and the module lines B0–B10. Analogous to FIG. 1, an adder ADD1 and ADD2 is provided in between the individual bus terminals BA0, BA1 and BA2, respectively, where these adders add a "1" to a signal applied to the bus lines L0–L3.

The module identification for the base printed-circuit board variation is described below.

In a first identification phase, in which the reset line is in the state "0," the individual modules identify their respective stack number, even if only one module is provided like with stack ST0. For this purpose, when the system is turned on a signal with the value "0" is applied, for example, to the lines L0–L3, said signal is fed to the module M00, and said signal corresponds to the stack number SN of this module. The adder ADD1 adds a "1" to this signal and routes the resulting signal with the value "1" to the lowest module M11 of the stack ST1 via the module lines B0–B3. This module routes the received signal unchanged to the next higher modules M12 and M13 of its stack ST1. The adder ADD2 simultaneously adds a "1" to this signal and routes the resulting signal with the value "2" to the modules M22 and M23, respectively, of the stack ST2.

In the base printed-circuit board variation, a different stack number SN is fed to each stack ST0–ST2, where said stack number is routed to all modules of the stack via the contacts K1–K4 and the counter contacts GK1–GK4, respectively.

When the reset changes from "0" to "1," each module stores its respective stack number with the rising edge of the reset signal.

In a second identification phase, reset=1. This corresponds to the normal operating condition of the electronic system. In this phase, the individual modules determine their respective tier numbers EN. For this purpose, a signal that, for example, has the value "0" is applied to the bus lines L0–03 and fed to the module M00 and to the modules M11 and M22, respectively, via the corresponding adders ADD1 and ADD2. The lowest modules M11 and M22 of the stacks ST1 and ST2, are assigned the respective tier numbers "1" and "2," respectively.

The adders ADD11–ADD13 and ADD22–ADD23 each add a "1" to these tier numbers and route, or transmit, the resulting value to the "next higher" module of the respective stack. For example, the tier number 2 is assigned to the second module M12 of the stack ST1 by the adder ADD11.

According to this method for example, in the base printed-circuit board variation the "lowest" module of a stack with the stack number 14 would be assigned the tier number 14, and the next higher module of the stack 14 would be assigned the tier number 15. The adder of this module would then also add a "1" which—in instances in which only four module lines B0–B3 are used for identification purposes—lead to an "overflow," i.e., to an addition "15+1=0." Thus, module in the third tier of the stack 14 would be assigned the tier number 0, the fourth module would be assigned the tier number 1, etc. An unambiguous identification of the modules of a stack is possible if an overflow occurs only if each tier number occurs once within the stack.

If the numbering of each of the lowest modules should begin with "0," a subtractor can be provided for each stack, where the subtractor subtracts the respective stack number from the tier numbers.

Figure 8B:
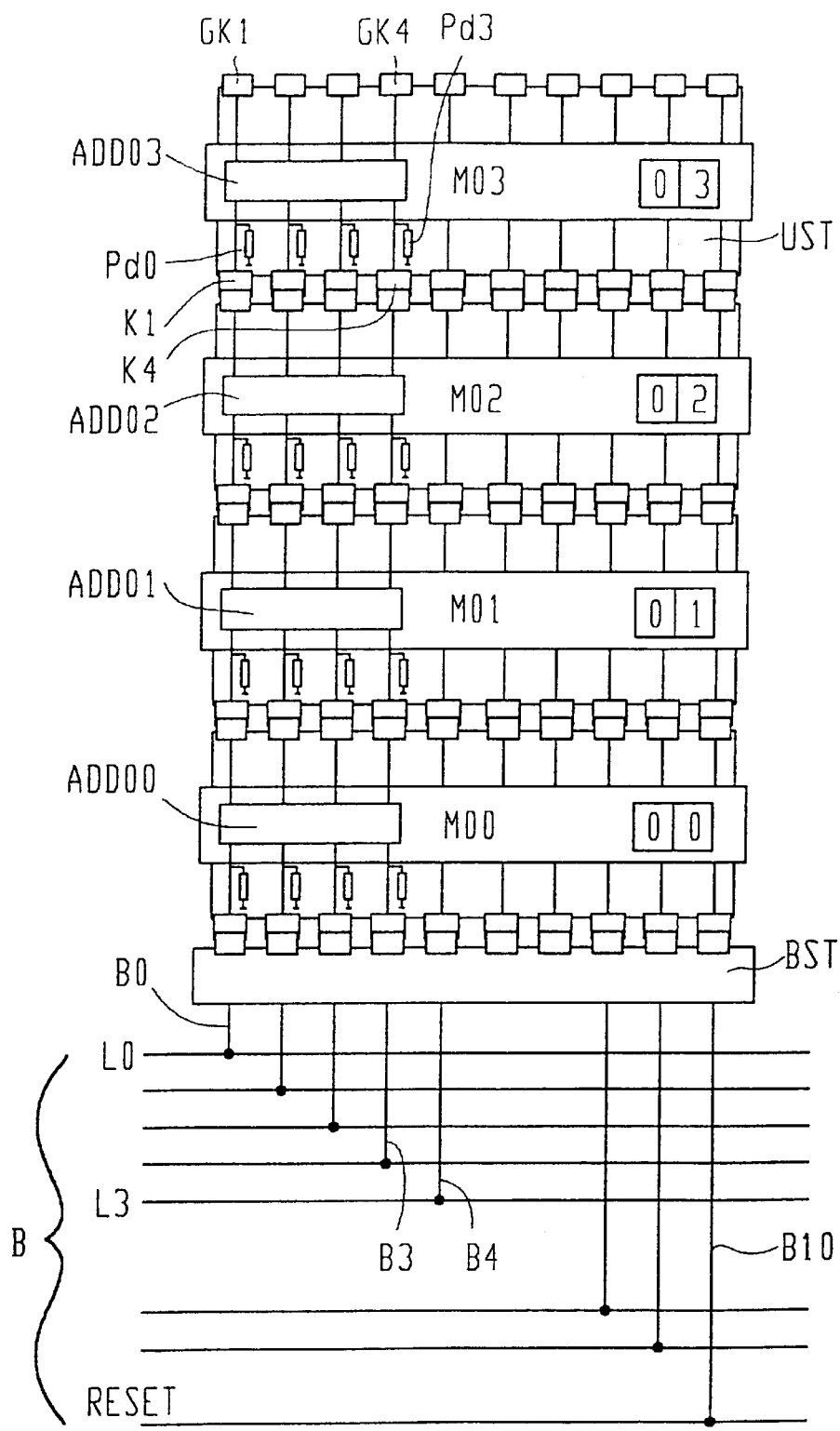

FIG. 8b shows a variation of the invention in which all modules are stacked one on top of the other in only one stack. This variation of the invention is referred to as the "stack variation" below. The individual modules M00–M03 correspond to the modules of the stacks ST1 and ST2, respectively, shown in FIG. 8a. In contrast to this figure, the contacts K1–K4 of the lower plug UST of each module M00–M03 are additionally connected to one respective pull-down resistor Pd1–Pd4. The contacts K1–K4 and the pull-down-resistors Pd1–Pd4 are connected to assigned counter contacts GK1–GK4 via the adders ADD00–ADD03. The remaining module lines B5–B10 are "looped through" the individual modules M00–M03, i.e., their signals are routed unchanged from one module to be "next higher" module. Analogous to FIG. 8a, the module line B10 is connected to a reset line. Additional bus or module lines may be provided, but this aspect will not be discussed in greater detail. The lowest module M00 does not necessarily have to be plugged into a base printed-circuit board, but-as shown here—it can be connected to the bus B via a bus connection plug BST or in.

As an alternative to the embodiment shown in this figure, the bus B may also terminate at the "lowest" module M00, i.e., it can also connect the modules M00–M03 to one another only "within" the stack.

The identification of the individual modules is described below.

After the system is turned on, the only stack number SN—in the stack variation—is determined in a first identification phase, in which Reset="0." In this case, no signal is initially transmitted to the bus lines L0–L3 such that the lowest module M00 receives a signal with the value "0" which is generated by its pull-down resistors Pd1–Pd4 and corresponds to the stack number. While Reset="0," a signal can be routed from the lower plug UST to the upper plug OST of a module without performing an addition directly or unchanged. In this case, all modules M00–M03 receive the same stack number "0."

When the reset changes from "0" to "1," the stack number "0" is—analogous to the base printed-circuit board variation—stored at the rising edge of the reset signal, where the tier numbers of the individual modules are determined while Reset="1." For this purpose, a signal, to which each adder ADD00–ADD03 of the individual modules M00–M03 adds a "1" and then stores the resulting tier numbers, is supplied via the bus lines L0–L3 and the module lines B0–B3, respectively. Alternatively, the tier number of the lowest module can also be impressed by the assigned pull-down resistors Pd1–Pd4.

In conclusion, it should be noted that the determination of a stack number in the stack variation is actually unnecessary because only one stack is provided. However, in certain applications it is desirable to use the same module for the stack variation as well as for the previously described base printed-circuit board variation. This is the reason why the assignment of a stack number is also provided in this case.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A self-configuring modular electronic system comprising:
   a data and address bus having a plurality of lines, one or more selected lines of the data and address bus having an identification signal applied thereto at a predetermined time;
   a plurality of bus terminals, each identification signal being routed from a previous bus terminal to a subsequent bus terminal;
   a plurality of addressable modules connected to an common reset line, each module having a series of module lines, one respective module line of each module being electrically connected to an assigned one of the bus lines at the bus terminal, each module determining the respective bus terminal from the identification signal, said bus having n select bus lines provided for identification purposes and more than $2^n$ modules connected thereto to be identified; and
   an arithmetic device arranged between each of two successive bus terminals for performing an arithmetical operation with the identification signal, said identification signal being successively fed to the first $2^n$ modules at a first reset signal level and changed by the arithmetic devices assigned to the first $2^n$ modules, subsequent arithmetic devices initially routing the identification signal unchanged, the first $2^n-1$ modules storing the values received with the identification signal and a first additional value that is common to the first $2^n-1$ modules when the reset signal level changes and all modules that follow the $2^n-1$ module subsequently storing a second additional value that differs from the first value, said identification signal being then also successively fed to subsequent modules that follow the $2^n$ module and changed by the arithmetic devices assigned to the subsequent modules that follow the $2^n$ module, the values fed to the subsequent modules with the identification signal being stored.

2. The self-configuring electronic system according to claim 1 wherein the arithmetic devices comprise full adders, each arithmetic device adding an integral addend to the input identification signal received and routing the sum to the next module if necessary, in the form of an identification signal, and wherein each arithmetic device has an output signal differing from the output signals of all remaining arithmetic devices.

3. The self-configuring electronic system according to claim 2 wherein the addend is a signal that corresponds to the number "1."

4. The self-configuring electronic system according to claim 1 wherein the arithmetic devices are arranged directly on the data and address bus.

5. The self-configuring electronic system according to claim 1 wherein the arithmetic devices are integrated into the individual modules.

6. The self-configuring electronic system according to claim 1 further comprising devices at the bus terminals for electrically connecting the modules to the data and address bus.

7. The self-configuring electronic system according to claim 1 wherein the modules are arranged in a single plane on a printed-circuit board.

8. The self-configuring electronic system according to claim 1 wherein at least two of the modules are stacked one on top of the other.

9. The self-configuring electronic system according to claim 8 wherein a plurality of stacks of individual modules are arranged adjacent to one another on a printed-circuit board.

10. The self-configuring electronic system according to claim 1 wherein one of the bus lines indicates the end of an identification phase, said select bus lines being used for transmitting data after completion of the identification phase, and wherein each module has first and second plugs and wherein the modules are plugged directly into one another, said plugs being selectively configured as module inputs or module outputs.

11. The self-configuring electronic system according to claim 10 wherein selected lines of the module inputs of the modules are connected to pull-down resistors.

12. A self-configuring modular electronic system comprising:
- a data and address bus having a plurality of lines, one or more selected lines of the data and address bus having an identification signal applied thereto at a predetermined time;
- a plurality of bus terminals, each identification signal being routed from a previous bus terminal to a subsequent bus terminal;
- a plurality of addressable modules, each module having a series of module lines, one respective module line of each module being electrically connected to an assigned one of the bus lines at the bus terminal, each module determining the respective bus terminal from the identification signal, the modules being arranged one on top of the other and/or adjacent to one another and each module being assigned a module number, said module number having a stack number and a tier number, the lowest modules of a stack receiving a signal that corresponds to their stack number via their respective module lines at a first reset signal level and routing the stack number to the remaining modules of their stacks unchanged, said modules storing their respective stack number when the reset signal level changes, the lowest modules of a stack further receiving a signal that corresponds to their tier number via their respective module lines at a second reset signal level; and
- an arithmetic device arranged between each of two successive bus terminals for performing an arithmetical operation with the identification signal, said arithmetic devices that are assigned to the individual modules of the stacks changing the tier number and routing the changed tier number to the next higher module of the respective stack.

13. The self-configuring electronic system according to claim 12 further comprising at least one subtractor assigned to each stack, said subtractor subtracting the stack number from the tier numbers of the modules of a stack.

14. A self-configuring modular electronic system comprising:
- a data and address bus having a plurality of lines, one or more selected lines of the data and address bus having an identification signal applied thereto at a predetermined time;
- a plurality of bus terminals, each identification signal being routed from a previous bus terminal to a subsequent bus terminal;
- a plurality of addressable modules arranged one on top of the other and/or adjacent to one another, each module having a series of module lines, one respective module line of each module being electrically connected to an assigned one of the bus lines at the bus terminal, each module determining the respective bus terminal from the identification signal, each module further being assigned a module number, said module number having a stack number and tier number, the lowest modules of a stack receiving a signal that corresponds to their stack number via their respective module lines at a first reset signal level and routing the stack number to the remaining modules of their stacks unchanged, said modules storing their respective stack number when the reset signal level changes, the lowest modules of a stack further receiving a signal that corresponds to their tier number via their respective module lines at a second reset signal level; and
- an arithmetic device arranged between each of two successive bus terminals for performing an arithmetical operation with the identification signal, said arithmetic devices that are assigned to the individual modules of the stacks changing the tier number and routing the changed tier number to the next higher module of the respective stack.

15. A self-configuring modular electronic system comprising:
- a data and address bus having a plurality of lines, one of the bus lines indicating the end of an identification phase, one or more selected lines of the data and address bus having an identification signal applied thereto at a predetermined time, said selected identification lines of the bus being used for transmitting data after completion of the identification phase;
- a plurality of bus terminals, each identification signal being routed from a previous bus terminal to a subsequent bus terminal;
- a plurality of addressable modules connected to an common reset line, each module having a series of module lines, one respective module line of each module being electrically connected to an assigned one of the bus lines at the bus terminal, each module determining the respective bus terminal from the identification signal, each module having first and second plugs, said modules being plugged directly into one another, said plugs being selectively configured as module inputs or module outputs, selected lines of the module inputs of the modules being connected to pull-down resistors; and
- an arithmetic device arranged between each of two successive bus terminals for performing an arithmetical operation with the identification signal.

* * * * *